(12) United States Patent
Zak

(10) Patent No.: US 7,599,778 B2
(45) Date of Patent: Oct. 6, 2009

(54) TRANSMISSION WITH INTELLIGENT GEAR SYNCHRONIZATION AND SHIFTING

(76) Inventor: Juan Zak, Frederiksborgvej 388, Roskilde (DK) 4000

( * ) Notice: Subject to any disclaimer, the term of this patent is extended or adjusted under 35 U.S.C. 154(b) by 619 days.

(21) Appl. No.: 11/423,932

(22) Filed: Jun. 13, 2006

(65) Prior Publication Data

US 2007/0250237 A1 Oct. 25, 2007

Related U.S. Application Data

(60) Provisional application No. 60/745,402, filed on Apr. 22, 2006.

(51) Int. Cl.
*F16D 27/12* (2006.01)
*F16H 63/36* (2006.01)
*G06F 19/00* (2006.01)

(52) U.S. Cl. .................. 701/66; 74/375; 477/124
(58) Field of Classification Search .................. None
See application file for complete search history.

(56) References Cited

U.S. PATENT DOCUMENTS

| | | | | |
|---|---|---|---|---|
| 4,860,607 A | * | 8/1989 | Numazawa et al. | 74/330 |
| 5,741,202 A | * | 4/1998 | Huber | 477/124 |
| 6,370,977 B1 | * | 4/2002 | Kubo et al. | 74/342 |
| 6,478,713 B1 | * | 11/2002 | Runde et al. | 477/107 |
| 6,886,424 B2 | | 5/2005 | Janson | |
| 2003/0024335 A1 | * | 2/2003 | Matsumoto et al. | 74/333 |
| 2004/0106498 A1 | | 6/2004 | Badillo | |
| 2005/0239597 A1 | * | 10/2005 | Shimada | 477/107 |

FOREIGN PATENT DOCUMENTS

| WO | 2005/005869 A1 | 1/2005 |
|---|---|---|
| WO | 2005/026570 A1 | 3/2005 |

* cited by examiner

*Primary Examiner*—Michael J. Zanelli

(57) ABSTRACT

This is a constant-mesh transmission that uses special latches, electromagnetic actuators to operate said latches, and an associated computerized control unit to command said actuators and, at the same time, synchronize the speed of the motor/engine and the gear trains with the speed of the transmission output shaft. During gear ratio changes, the transmission control cooperates with the motor/engine control in such a way that speed differences between—and torque transmitted through—the gear trains involved and the output shaft are minimal; this permits effortless and on-the-fly coupling and decoupling of gears to/from the output shaft, without requiring any clutch operation. This transmission can be used in a variety of automotive and industrial applications, and is mainly intended for automotive vehicles with internal combustion engines.

10 Claims, 6 Drawing Sheets

TRANSMISSION WITH INTELLIGENT GEAR SYNCHRONIZATION AND SHIFTING

RELATED APPLICATIONS

This application claims the priority date of U.S. Provisional Application Ser. No. 60/745,402 filed Apr. 22, 2006.

BACKGROUND OF THE INVENTION

1. Field of the Invention

This invention relates to a constant-mesh transmission that uses electromagnetically operated latches and an associated computerized control to intelligently perform gear synchronization and gear shifting. This transmission can be used in a variety of automotive and industrial applications, and is mainly intended for automotive vehicles with internal combustion engines.

2. Description of the Prior Art

During a gear ratio change, prior-art automotive manual transmissions, either automated or not, use brute force to resynchronize the speed of the gear trains to the speed of the output shaft. In most prior-art transmissions, the synchronization is performed by friction cones placed both on the gears and the matching collars splined to the output shaft. This approach adds stress and wear to transmission components. An additional problem is that the transmission must be disengaged from the engine prior to the gear change, and then re-engaged after said change is completed. The power output of the engine must be reduced during said disengagement to avoid a speed spike, and then smoothly increased during the re-engagement to match the new speed of the gear trains. The duration and smoothness of the gear change very much depend on the skills of the driver or the sophistication of the automated shift system. In conclusion, the synchronization by friction cones affects the performance and drivability of the vehicle, and at the same time adds stress and wear to transmission components.

Another brute-force approach, mainly intended for racing applications, is the use of warts (dogs) on the collars (dog rings) and matching slots on the sides of the gears. Dogs and slots are forcibly engaged during gear shifts to bring the engine and transmission gear trains into synchronization with the output shaft. Although mechanically simpler and providing very fast gear shifts as compared to friction cones, the dog-type synchronization delivers harsh shifts and torque spikes, and causes high backlash in the transmission. Moreover, the dogs and slots are subject to high impact during engagement, which shortens their live and puts substantial stress on both the engine and the whole powertrain. These characteristics make dog-type transmissions unsuitable for mainstream automotive applications.

A recent design, disclosed in publication WO 2005/026570, seemingly reduces backlash and provides instant gear shifting when compared to earlier dog-type transmissions. Warts and collars are substituted by bars sliding in sleeves; slots in the gear sides are replaced by tabs that fit between the bar ends. Since the speed synchronization is made in a very short time, the impact between said bars and tabs during gear shifts is higher than in previous dog-type transmissions. Thus, harsh shifts, torque spikes, component wear, and stress on the engine and powertrain are even more severe than in earlier dog-type designs.

Publication WO 2005/005869 discloses a control system intended to mitigate the above mentioned torque spikes in the WO 2005/026570 transmission. This is a rather complex control system that monitors the torque transmitted through sensors in the transmission case and vehicle chassis, and mitigates torque spikes by slightly releasing the clutch during gear shifts. Obvious drawbacks of said control system are the additional mechanical and electronic parts required which increase the overall complexity and cost of this transmission.

Another important drawback in the WO 2005/026570 transmission is an inherent design limitation by which shifts can happen only between neighboring gears. This means that a transmission with N speeds requires (N−1) sleeves, and at least (N−2) shared gears (i.e. gears with tabs on both sides). If shared gears are not feasible, the number of gears is as high as (2N−2). In conventional manual transmissions shifts are also possible between non-neighboring gears, thus only N/2 or (N/2+0.5) collars are needed, and no shared gears are necessary. For example, a five-speed WO 2005/026570 transmission would require four sets of sleeves with bars ($1^{st}$ to $2^{nd}$, $2^{nd}$ to $3^{rd}$, $3^{rd}$ to $4^{th}$, and $4^{th}$ to $5^{th}$), and three shared gears ($2^{nd}$, $3^{rd}$ and $4^{th}$). If shared gears are not feasible, as much as eight gears would be necessary instead of the usual five. By contrast, a conventional five-speed manual transmission needs only three collars ($1^{st}$ to $2^{nd}$, $3^{rd}$ to $4^{th}$, and $5^{th}$), the latter usually shared with the reverse gear. The increased number of sleeves in the WO 2005/026570 transmission requires a longer output shaft, and thus a bigger and heavier transmission case; the effect of any additional gears on the transmission size, weight and complexity is even more substantial, since these are actually pairs of meshed gears.

The present invention discloses a compact latch mechanism, an electromagnetic actuator to operate said latch mechanism, and an associated computerized transmission control unit (TCU) to command said actuator and, more importantly, to synchronize the speed of the engine and gear trains with the speed of the transmission output shaft. The TCU cooperates with the engine control unit (ECU) in such a way that speed differences between—and torque transmitted through—the gear trains involved and the output shaft are minimal during gear ratio changes; this permits effortless and on-the-fly coupling and decoupling of gears to/from the output shaft, without requiring any clutch operation. The shafts and gears are arranged in the same way as in conventional constant-mesh transmissions.

The proposed latch-gear set is more compact than the conventional collar-gear set with friction cones. Similarly, the proposed electromagnetic actuator takes less space than conventional forks and actuators, either manual or automated. Thus, this transmission is smaller than an equivalent prior-art transmission with the same number of speeds. Or, the other way around, this transmission can pack more gears into the same space, which means more speeds in a given transmission case.

The transmission disclosed herein is in fact an automated manual transmission that overcomes known drawbacks of prior-art automated implementations: sluggish shift feel, and bulky and complex actuators for gear shifting and clutch operation.

Different approaches have been proposed to improve the slow shift in automated manual transmissions. The recent U.S. Patent Application 20040106498 (Badillo et al.) describes a method to reduce speed flare during the engine torque reduction phase prior to a gear shift. This method seemingly reduces shift delays coming from the engine side, but obviously cannot eliminate the time needed to disengage and then re-engaging the clutch, which is inherent to the already described friction-type synchronization. By contrast, the transmission disclosed in the present invention does not require any clutch operation during gear shifts, and thus does not incur in clutch-related delays.

U.S. Pat. No. 6,886,424 (Janson et al.) proposes a second layshaft with gears and a one-way clutch to transmit torque during gear shifts. This approach avoids torque interruptions during said shifts at the expense of substantial added mechanical complexity, size and weight. The transmission provided in the present invention offers comparable shift quality in a much simpler and compact mechanical arrangement.

BRIEF SUMMARY OF THE INVENTION

The present invention relates to a constant-mesh transmission that uses special latches, electromagnetic actuators, and an associated transmission control unit (TCU) to intelligently perform gear synchronization and gear shifting. This transmission is applicable to a variety of automotive and industrial applications, and is mainly intended for automotive vehicles with internal combustion engines.

The principal object of this invention is to provide a transmission that overcomes the drivability and performance problems, and the component stress and wear of prior-art manual transmissions. It is a further object of the transmission disclosed herein to overcome the slow shift, mechanical complexity and bulkiness of prior-art automated manual transmissions.

For the sake of simplicity, the following description considers only two pairs of gears mounted fixedly on the layshaft and rotatably on the output shaft. A sleeve is fixedly mounted on the output shaft between said gears. The latch consists of a number of bars, slidably fit in trapezoidal axial slots on said sleeve, and fixed to the inside face of a ring. All the bars form a single unit with said ring that slides freely along the slots on the sleeve. When moved to either side, the bar ends engage into matching slots carved on the side of the neighboring gears. The side faces of the bar ends and the slots are slightly oblique to induce a torque lock between them. The latch locks either gear to the output shaft when moved to the corresponding side, or remains in the central position to leave the gears disengaged.

Preferably, the latch is operated through an electromagnetic actuator that contains three electric coils fixed to the transmission housing. Said coils are energized only during gear shifting events. Each coil is equipped with a position sensor that keeps track of the position of the latch ring.

The TCU performs a complete shift from one of the gears to the other by switching on and off the central coil and then the opposite end coil in a very fast sequence. The TCU fully controls the latch position through the electromagnetic actuator, and cooperates with the engine control unit (ECU) to control the engine torque and speed during gear shifts.

The torque direction through the transmission is important at the moment of unlocking the latch from a gear. The TCU determines this direction by comparing the current throttle position to the corresponding no-load value stored in its memory. The TCU energizes the central coil to pull the latch out, while requesting the ECU to momentarily stop the fuel injection or fully open the engine throttle, depending of said torque direction.

The TCU constantly computes the synchronous speed of the engine for the current speed of the output shaft. When the latch is moving out of the slots in the gear being deselected, the TCU requests the ECU to either stop the fuel injection (upshift) or fully open the engine throttle (downshift) until the engine reaches the synchronous speed. When the engine speed reaches a threshold value over (for upshifts) or under (for downshifts) said synchronous speed, the TCU energizes the corresponding side coil to engage the latch with the new gear. When the latch is fully engaged with the new gear, the TCU requests the ECU either to reinstate its normal control over the fuel injection pulse width, or to reestablish the original position of the throttle and return its control to the driver.

Gear shifts in this transmission do not involve any clutch operation. On the contrary, the TCU does require that the engine and the transmission stay always connected by the clutch. In case a manual clutch is provided for starting and stopping the vehicle, the operation of the clutch by the driver must be blocked or delayed during gear shifts.

DETAILED DESCRIPTION OF PREFERRED EMBODIMENTS

The following description of the transmission disclosed herein includes many details that should not be considered as limitations of this invention, but rather as examples of a number of possible variations. Thus, the scope of the present invention should be determined by the appended claims and their legal equivalents, and not by the below described embodiments.

The shafts and gears in this transmission are arranged in the same way as in conventional constant-mesh transmissions. However, for the sake of simplicity, the following description refers only to two pairs of gears. Also, such description assumes that this transmission is driven by a conventional Otto-cycle engine with electronic fuel injection; other internal combustion engines, such as common-rail diesel engines, are also suitable.

Figure 1:
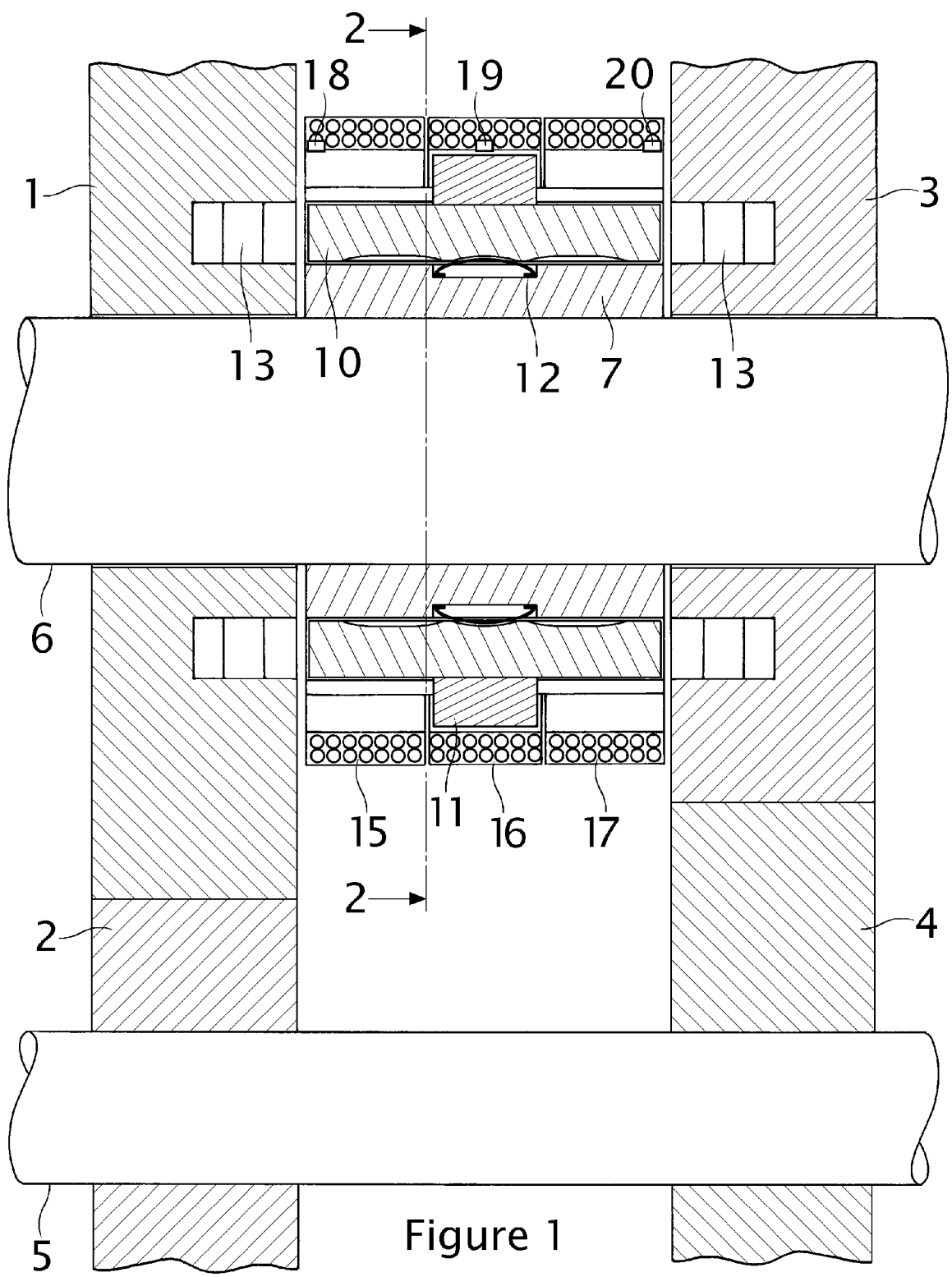
FIG. 1: Sectional view of the latch mechanism, electromagnetic actuator and gears, along line 1-1 of FIG. 2.
Figure 2:
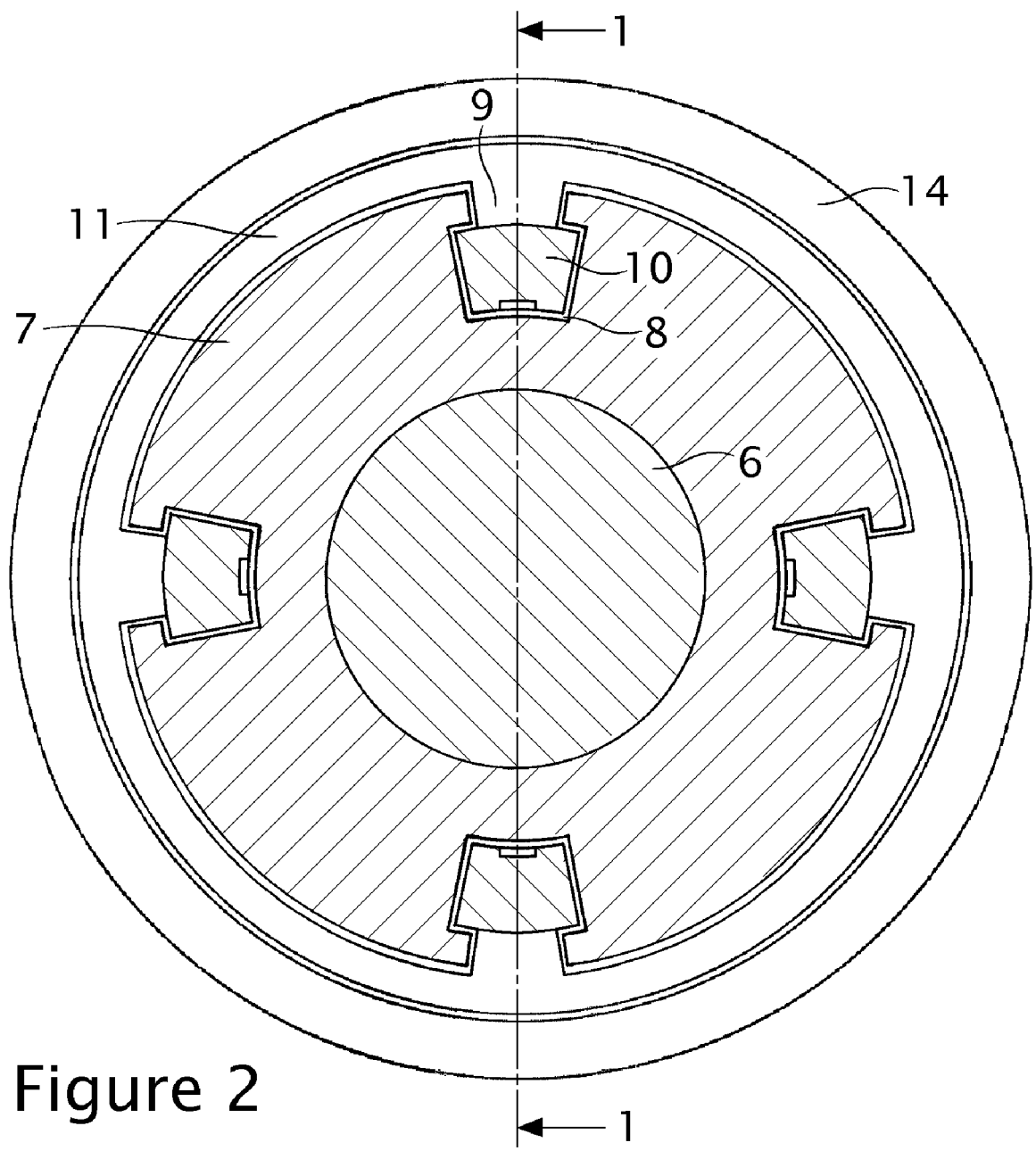
FIG. 2: Sectional front view of the latch mechanism and electromagnetic actuator, along line 2-2 of FIG. 1.

FIG. 1 shows two pairs of gears 1, 2 and 3, 4 mounted on shafts in the conventional way (fixedly on the layshaft 5 and rotatably on the output shaft 6). A sleeve 7 is fixedly mounted on the output shaft 6 between gears 1 and 3. The sleeve 7 has at least four trapezoidal slots 8 cut axially along its cylindrical body, equiangularly distributed (in this case every 90 degrees), as indicated in FIG. 2.

The latch 9 consists of a number of bars 10 (as many as slots on the sleeve 7), fixed equiangularly to the inside face of a ring 11. Said bars form a single unit with said ring. The latch bars 10 fit closely into the slots 8 on the sleeve 7 but can slide freely along them (FIG. 2). A small spring 12 retains each bar 10 axially centered over the sleeve 7 when no sliding force is applied.

The latch bars 10 and the sleeve 7 have the same width. When the latch 9 is moved axially, the bars 10 engage into matching slots 13 radially distributed on the sides of each neighboring gear (1 and 3), thus locking said gear to the output shaft 6. In order to maximize the coupling opportunities, there are as many slots 13 as possible to fit on the gear sides following the design explained below.

Figure 3:
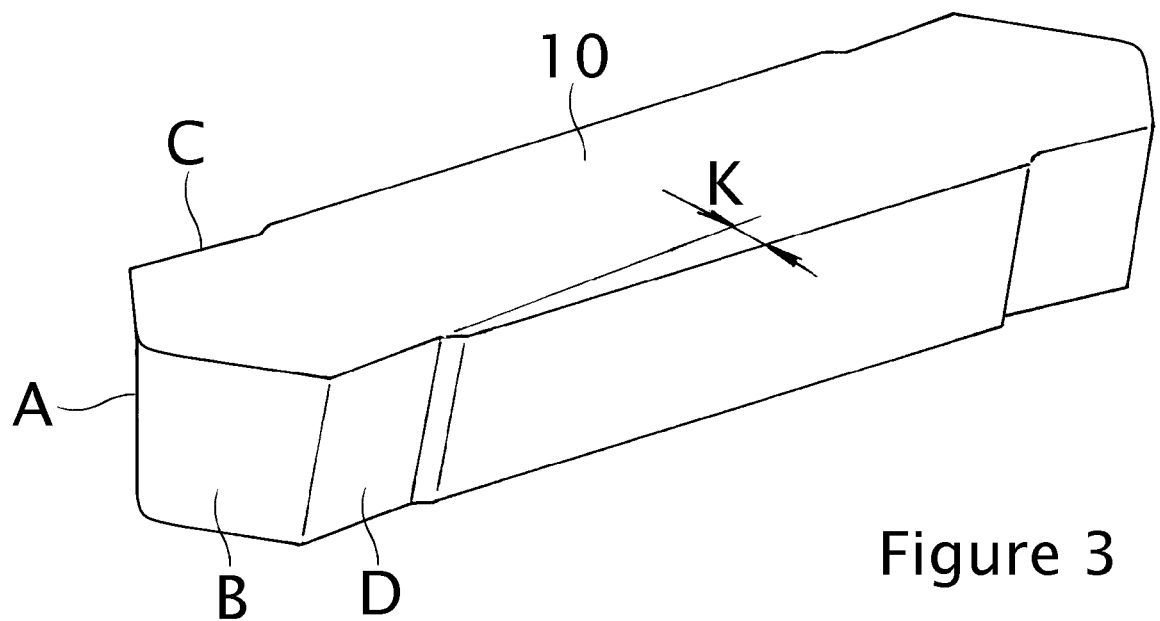
FIG. 3: Perspective view of a latch bar.
Figure 4:
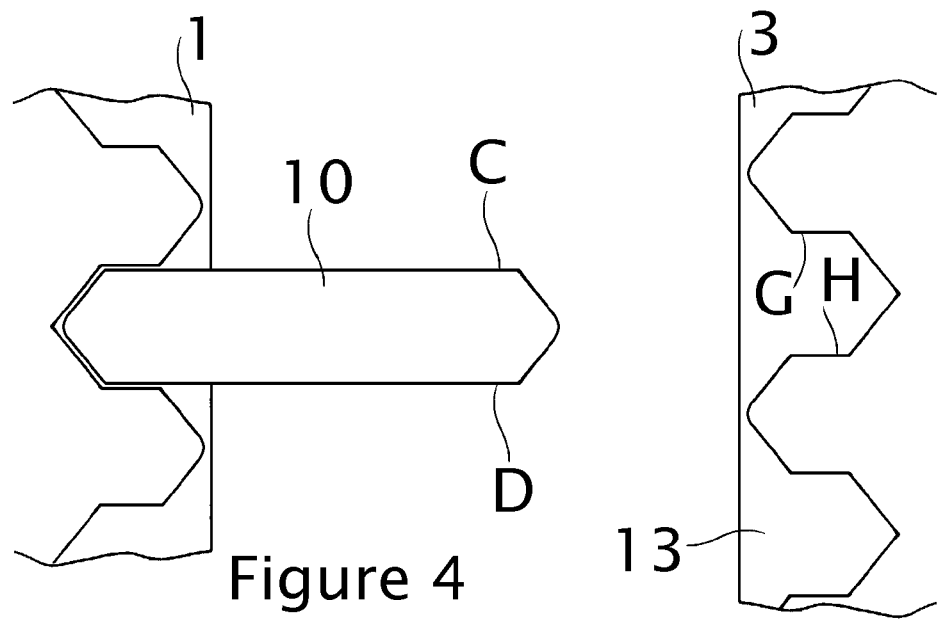
FIGS. 4 to 7: Schematic plan views of four consecutive positions of a latch bar during gear shifting.

The bars 10 have a wide-angle tooth with a rounded front edge on each end (FIG. 3). The matching slots 13 on the gears have also teeth on their outer border, with the same angle and rounded edge as the teeth on the latch bar ends (FIG. 4). When the bars 10 reach the side of the gear 3 to be engaged (FIG. 6), bar faces A or B get in contact with faces F or E of the corresponding slots 13 in said gear, and provide the final speed synchronization between the sleeve (not shown) and the gear 3. Bar faces A and B also guide the bars to a complete engagement by sliding over faces F or E on the gear slots 13.

In case of excessive rotational speed difference between the sleeve 7 and the gear 3, the bars 10 are prevented from entering the slots 13 by either faces E or F (FIG. 5) until the actuator (described later) overcomes the resistance; this interaction between bars 10 and slots 13 smoothly brings the sleeve 7 and the gear 3 into synchronous speed. In practice, such excessive speed differences should rarely occur as consequence of abnormal disturbances in the powertrain or the engine that the transmission control unit (described later) is unable to compensate.

Bar faces C and D are not parallel but slightly oblique (angle K in FIG. 3). The same angle is applied to matching faces G and H in any gear slot (FIG. 4). For simplicity, faces C, D, G and H are not drawn oblique in FIGS. 4, 5, 6 and 7. The angle K prevents any spontaneous disengagement of the latch by inducing a torque lock between bars 10 and slots 13. This angle has however a negative influence on the transmission backlash, and thus should be kept to a practical minimum. When no torque is transmitted and thus no torque lock is induced, each latch bar 10 is held in the engaged position by the spring 12.

Figure 5:
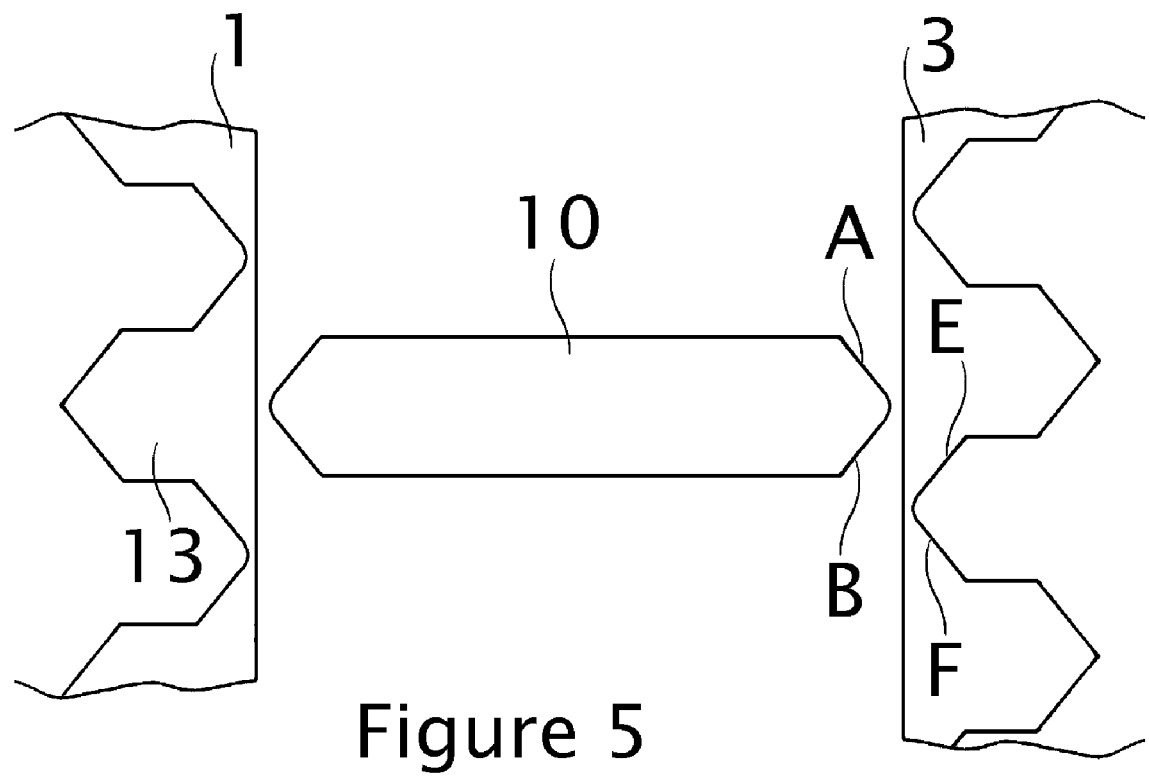
Figure 6:
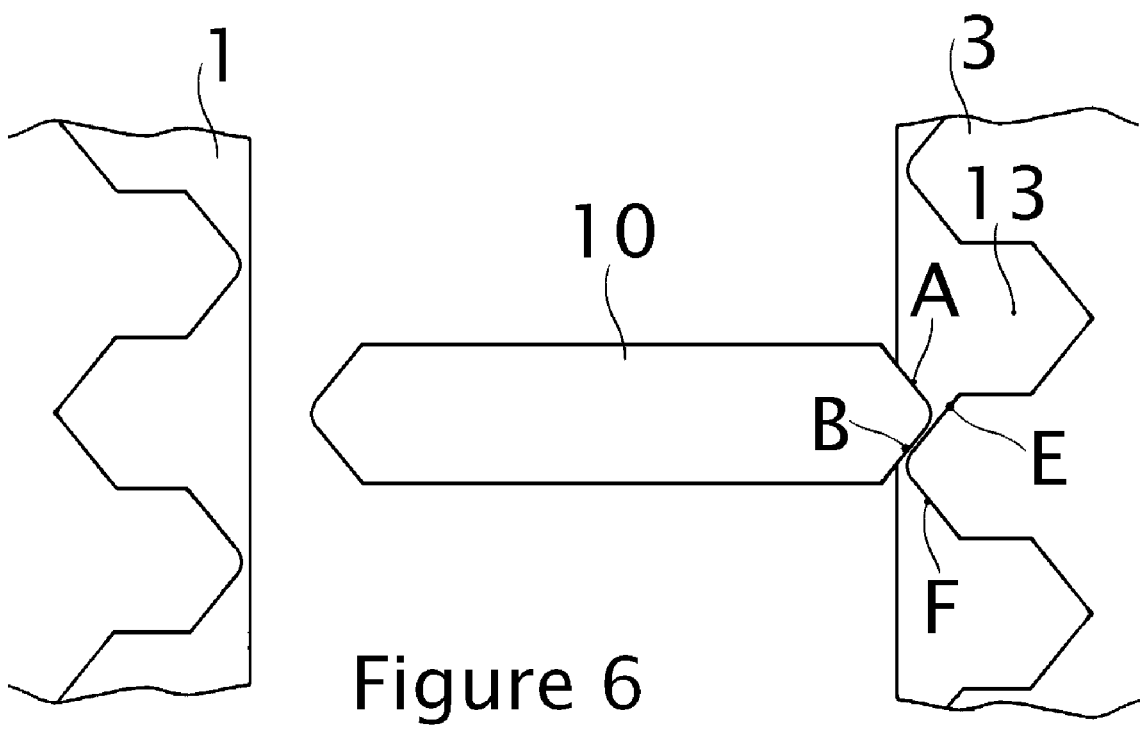
Figure 7:
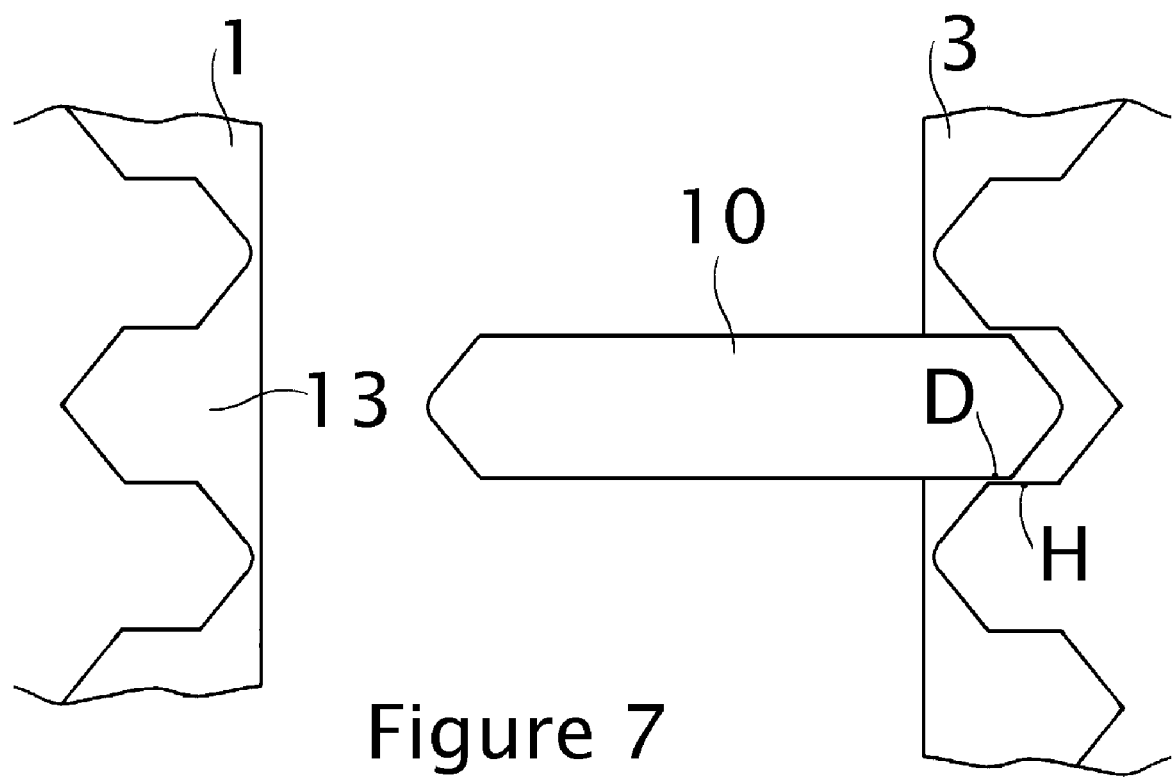

FIG. 4 is a schematic view of a latch bar 10 coupled to the left gear 1. In FIG. 5 the latch bar 10 has released the left gear 1 and is axially aligned with the sleeve (not shown), i.e. in neutral position. FIG. 6 shows a latch bar 10 in process of engaging the right gear 3; in most cases, there will be a minor speed difference between the latch bars 10 and the gear slots 13; in this particular example, face B on the bar 10 slides over face E on the slot 13 towards the gear 3. In FIG. 7 bar face D has just engaged with slot face H and thus the speed of the gear 3 and the sleeve (not shown) is the same. Since both faces D and H (FIG. 7) are slightly oblique by the same angle (not shown), any torque transmitted through them will prevent the bar 10 from sliding out of the gear slot 13, and help instead the actuator (not shown) pulling the bar fully in.

The number of slots 8 on the sleeve 7 is an important parameter in the transmission design because it has a cascade effect that ultimately affects the speed and quality of the gear shift. More slots on the sleeve allow for thinner latch bars 10 and thus smaller slots 13 on the gear sides; more bars and gear slots give more opportunities for engagement, and at the same time require a shorter travel of the latch between the neutral and the fully engaged position. An easier engagement and a shorter latch travel provide faster and smoother gear shifts. In practice, six to eight slots per sleeve provide good quality shifts without adding excessive complexity to the latch. Four slots per sleeve are considered the practical minimum.

Although the latch could be operated by any of the conventional means, e.g. fork and levers, electric servomotor or electrohydraulic actuator, the preferred option is the special electromagnetic actuator described below. This particular actuator is mechanically very simple, and provides very fast operation in cooperation with the computerized transmission control unit (TCU) described further down.

The electromagnetic latch actuator 14 consists of three electric coils 15, 16 and 17 fixed to the transmission housing, and placed as shown in FIGS. 1 and 2. Said coils are energized only during gear shifting events. Each coil is equipped with a position sensor (18, 19 and 20) that keeps track of the position of the latch ring 11.

Preferably, the above mentioned position sensors are of the optoelectronic type, each consisting of a light emitting diode (LED) and a photodiode installed side by side. The outer face of the latch ring 11 is reflective and has a plurality of coded dark areas. Variations in the light or the lack of light reflected on the photodiodes signal the position of the latch ring 11 in relation to position sensors 18, 19 and 20.

When the left coil 15 is energized by the TCU, its magnetic field attracts the latch ring 11, thus moving the latch 9 towards the left gear 1 and coupling said gear to the output shaft 6. The left side position sensor 18 detects the completion of the engagement and informs the TCU, which in turn disconnects the coil 15. When the central coil 16 is energized, it attracts the latch 9 back over the center of the sleeve 7, thus releasing the left gear 1; the TCU disconnects the coil 16 when the central position sensor 19 detects that the latch ring 11 is in the neutral position. The right gear 3 is engaged in the same way by energizing the right coil 17.

A complete gear shift is accomplished by switching on and off the appropriate two coils in a very fast sequence. For example, to perform a gear shift from the left gear 1 to the right gear 3, the TCU briefly connects the central coil 16 until the central sensor 19 detects that the latch ring 11 is in neutral position, then connects the right coil 17 until the right sensor 20 detects that the right gear 3 is fully engaged. If needed, the shifting time can be further reduced by connecting the right coil 17 before the latch 9 reaches the neutral position.

Figure 8:
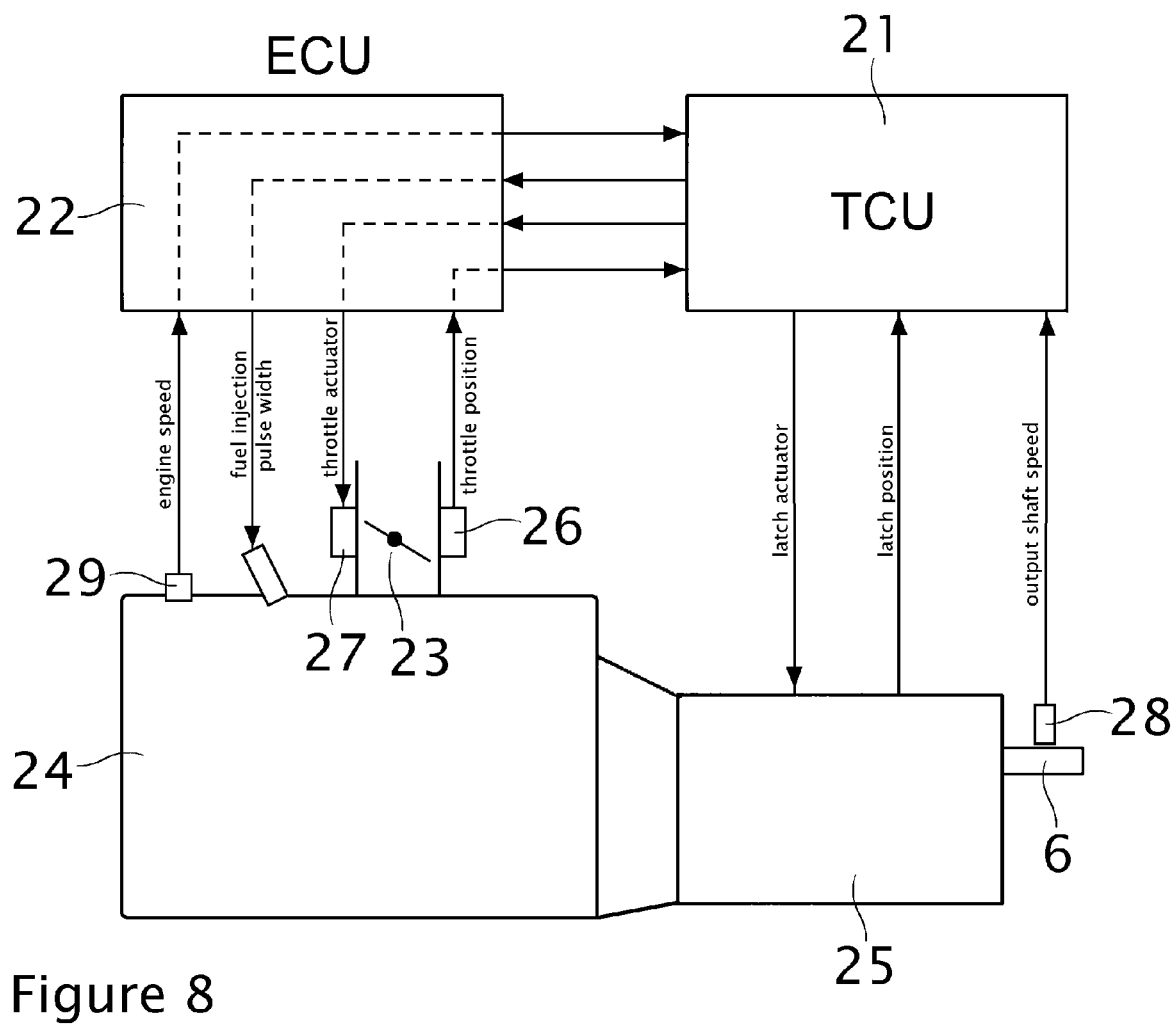
FIG. 8: Schematic diagram of the interaction between the transmission, the transmission control unit (TCU), the engine and the engine control unit (ECU).

During gear shifts, the TCU 21 (FIG. 8) manages in real time seven main variables: latch position, previous and desired new gear ratio, engine speed, engine fuel injection, engine throttle position, and output shaft speed (i.e. vehicle speed). The TCU has full control over the latch position through the electromagnetic actuator 14, as already described, and during gear shifts cooperates with the engine control unit (ECU) 22 to control the engine torque and speed, via fuel injection and/or throttle position. Said ECU is a conventional engine control unit modified to exchange data and commands with the TCU disclosed herein. During gear shift events, the ECU should be able to rapidly modify and then restore, via a suitable actuator, the original engine throttle position indicated by the driver. The ECU should also be able to stop and reinstate the fuel injection pulse width as requested by the TCU.

The TCU has no control or influence over the vehicle speed but rather uses it as a reference to coordinate some of the other variables. The desired new gear ratio is also a reference, unless the TCU has built-in capability to judging and correcting the desired ratio if not suitable for the vehicle current speed.

The TCU constantly calculates the no-load throttle position corresponding to the current engine speed rotation. The no-load position is the position that the throttle 23 would have if the engine 24 operates disengaged from the transmission 25 at the current engine speed. Base values for the no-load throttle position are provided by the engine manufacturer, and are stored in lookup tables in the TCU memory. In the simplest implementation, the TCU retrieves the corresponding base value from its memory. A more sophisticated approach is to compute the no-load throttle position in the TCU microprocessor through a parametric equation that adjusts the base value with factors to other relevant parameters like engine temperature and presence of auxiliary loads (e.g. air conditioning). Such factors are also provided by the engine manufacturer and are stored in lookup tables.

The no-load throttle position is used by the TCU to determine the torque direction through the transmission. If the engine is driving the vehicle powertrain (positive torque), the throttle is open past the no-load position. If the engine is driven by the powertrain (negative torque), the throttle does not reach the no-load position. If the throttle is open at a position very close to the no-load value, there is very little or no torque being transmitted. The current throttle position is measured by the ECU 22 through sensor 26 (FIG. 8) and transmitted to the TCU 21.

Determining the torque direction is important because of the torque lock used to maintain the latch bars engaged with the gear slots. The TCU uses a very simple way to unlock the latch bars: it energizes the central coil 16 to pull the latch 9 out, while requesting the ECU to momentarily either stop the fuel injection (in case the torque is positive) or fully open the engine throttle through the actuator 27 (in case the torque is negative). The subsequent movement of the latch bars out of the gear slots is detected by the corresponding side position sensor on the coil and informed to the TCU. At this moment the TCU triggers the synchronization procedure to allow a smooth coupling of the latch with the desired new gear, as described below.

The TCU constantly computes the synchronous speed of the engine that would be needed to engage any gear to the output shaft at its current speed. In other words, said synchronous speed is the engine speed at which any particular gear has the same speed as the output shaft. As said before, the speed of this shaft is determined by the vehicle speed and thus is the reference to match. The TCU microprocessor calculates the synchronous engine speeds for every gear from the transmission gear ratios and the speed of the output shaft 6 measured by the corresponding sensor (28 in FIG. 8).

In case of an upshift, the current speed of the engine is higher than its synchronous speed for the desired new gear. In case of a downshift, the current engine speed is lower than its synchronous speed for said gear.

When the TCU is informed by the position sensor on the side coil that the latch is moving out of the slots in the gear being deselected, the TCU requests the ECU to either stop the fuel injection (in case of an upshift) or fully open the engine throttle (in case of a downshift) until the engine reaches the synchronous speed for the selected new gear. During this period, the TCU monitors the engine speed ramp through the ECU engine speed sensor (29 in FIG. 8). In the meantime, the latch comes to neutral position. When the engine speed reaches a threshold value over (for upshifts) or under (for downshifts) the synchronous speed for the new gear, the TCU energizes the corresponding side coil to engage the latch with the new gear. The purpose of energizing the coil at the threshold speed is to offset the coil response time and the travel time of the latch. The simplest approach is to apply always the same base threshold.

A more sophisticated approach is to use a variable threshold that considers the initial and final values of the engine speed ramp. This threshold is constantly calculated by the TCU microprocessor through a parametric equation that adjusts the base threshold with factors to other relevant parameters like current and target synchronous speed of the engine. Such factors are stored in lookup tables in the TCU memory.

Yet another approach is to predict the time the engine takes to reach the synchronous speed from the current speed, and advance the activation of the side coil accordingly. The value of such time is computed on a permanent basis by the TCU microprocessor through a parametric equation from measured variables and factors provided in corresponding lookup tables. This approach avoids the delay otherwise incurred by the TCU in getting the engine speed readings from the ECU, and comparing them with the threshold speed.

When the TCU is informed by the position sensor on the coil that the latch is fully engaged, the TCU requests the ECU either to reinstate its normal control over the fuel injection pulse width, or to reestablish the original position of the throttle and return its control to the driver.

Gear shifts in this transmission do not involve any clutch operation. On the contrary, the TCU does require that the engine and the transmission stay always connected by the clutch. In case a manual clutch is provided for starting and stopping the vehicle, the operation of the clutch by the driver must be blocked or delayed during gear shifts.

As in conventional automated manual transmissions, gear shifts can be ordered to the TCU by the driver via a shift-by-wire device, or can be decided by the ECU in cooperation with the TCU on the basis of the torque demanded by the driver, the vehicle speed, and the engine speed and load.

The above description of the operation of the electromagnetic actuator and the TCU is made on a procedure basis to facilitate comprehension. In practice, the gear shift is carried as a continuous procedure with different microevents, some happening sequentially and others at the same time. The most evident example of this fact is a normal upshift which by default requires positive torque; both the torque-lock break to disengage the dumped gear, and the subsequent engine speed synchronization to engage the desired new gear, are achieved by continuously stopping the fuel injection. Similarly, a normal downshift requires fully opening the throttle from the torque-lock break to the engagement of the new gear.

The shift time can be reduced by a smart programming of the microevents. For example, the gear-to-gear travel time of the latch can be reduced by energizing the side coil close to the new gear shortly after or at the same time that the central coil. This of course is not practicable when the shift is made between gears in different latch-gear sets.

Given the continuous decrease in the cost of microprocessing power and memory capacity, it might be cheaper to integrate the TCU disclosed herein into a conventional ECU, thus sharing the microprocessor and random access memory. Transmission-specific data could be kept in an interchangeable module. An additional advantage of this arrangement is that inherent communication delays between the TCU and the ECU could be avoided.

What is claimed is:

1. A transmission comprising:
   a) a layshaft coupled to an engine or motor, the speed and torque output of said engine or motor being managed by a control unit;
   b) an output shaft, parallel to said layshaft, coupled to a mechanical load;
   c) a plurality of pairs of meshed gears, each of said pairs consisting of a layshaft gear mounted fixedly on said layshaft, and an output gear meshed with said layshaft gear, said output gear being mounted rotatably on said output shaft; the first of said pairs providing a first gear ratio, the second of said pairs providing a second gear ratio, and so forth as required by the number of speeds provided by said transmission;
   d) a system for shifting from a previously selected output gear to a newly selected output gear, and for synchronizing the speed of said newly selected output gear with the speed of said output shaft, said system further comprising:
   a plurality of latches mounted on said output shaft; the first of said latches mounted between said pairs of gears providing said first and said second gear ratios, the second of said latches mounted between said pairs of gears providing said third and said fourth gear ratios, and so forth as required by said number of speeds provided by said transmission; every said latch selectively locking either adjacent output gear to said output shaft, or releasing either adjacent output gear from said output shaft;

in every output gear adjacent to said latches, a plurality of slots, radially distributed along said gear's side facing said latch, said slots receiving and securing the ends of said latch as to lock said output gear to said output shaft;

electromagnetic actuators to operate each of said latches; and, a computerized transmission control unit to command said latch actuators, and to synchronize, in cooperation with said control unit of said engine or motor, the speed of said output gears with the speed of said output shaft.

2. The transmission according to claim 1, wherein:

every said latch consists of a plurality of bars sliding along matching axial slots equiangularly cut in a sleeve fixedly mounted on said output shaft, said bars being equiangularly fixed to the inside face of a latch ring as to form a single unit sliding freely over said sleeve, said bars having a wide-angle tooth with a rounded front edge on each end, and said bar ends having slightly oblique sides as to provide torque lock when engaged with—and transmitting torque through—said adjacent output gears;

said slots in said output gears have teeth on their outer border, with the same angle and rounded front edge as said teeth on said latch bar ends, such that either face of every said tooth on said bar ends slides over either face of every said tooth on said output gears as to smoothly engage said latch bar ends into said slots of said output gears; said slots having slightly oblique sides, by the same angle as said bar ends in said latches, as to provide torque lock when torque is transmitted between said slots and said bar ends; and, every said electromagnetic latch actuator consists of a central coil and two side coils, said three coils being placed side by side and fixed to said transmission's housing as to encircle their corresponding latch, said three coils selectively attracting said latch ring of said latch to either engage said latch with either adjacent output gear, or disengage said latch from either adjacent output gear; each of said coils being equipped with a suitable latch position sensor to detect the axial position of said latch ring with respect to its sleeve.

3. A transmission comprising:

a) a layshaft coupled to an engine, the speed and torque output of said engine being managed by an engine control unit through commanding said engine's fuel injection and throttle position;

b) an output shaft, parallel to said layshaft, coupled to a powertrain;

c) a plurality of pairs of meshed gears, each of said pairs consisting of a layshaft gear mounted fixedly on said layshaft, and an output gear meshed with said layshaft gear, said output gear being mounted rotatably on said output shaft; the first of said pairs providing a first gear ratio, the second of said pairs providing a second gear ratio, and so forth as required by the number of speeds provided by said transmission;

d) a system for shifting from a previously selected output gear to a newly selected output gear, and for synchronizing the speed of said newly selected output gear with the speed of said output shaft, said system further comprising:

a plurality of latches mounted on said output shaft; the first of said latches mounted between said pairs of gears providing said first and said second gear ratios, the second of said latches mounted between said pairs of gears providing said third and said fourth gear ratios, and so forth as required by said number of speeds provided by said transmission; every said latch selectively locking either adjacent output gear to said output shaft, or releasing either adjacent output gear from said output shaft; every said latch consisting of a plurality of bars sliding along matching axial slots equiangularly cut in a sleeve fixedly mounted on said output shaft, said bars being equiangularly fixed to the inside face of a latch ring as to form a single unit sliding freely over said sleeve, said bars having a wide-angle tooth with a rounded front edge on each end, and said bar ends having slightly oblique sides as to provide torque lock when engaged with—and transmitting torque through—said adjacent output gears;

in every output gear adjacent to said latches, a plurality of slots, radially distributed along said gear's side facing said latch, said slots receiving and securing said ends of said latch as to lock said output gear to said output shaft; said slots having teeth on their outer border, with the same angle and rounded front edge as said teeth on said latch bar ends, such that either face of every said tooth on said bar ends slides over either face of every said tooth on said output gears as to smoothly engage said latch bar ends into said slots of said output gears; said slots having slightly oblique sides, by the same angle as said bar ends in said latches, as to provide torque lock when torque is transmitted between said slots and said bar ends;

electromagnetic actuators to operate said latches, every said latch actuator consisting of one central coil and two side coils, said three coils being placed side by side and fixed to said transmission's housing as to encircle their corresponding latch, said three coils selectively attracting said latch ring of said latch to either engage said latch with either adjacent output gear, or disengage said latch from either adjacent output gear; each of said coils being equipped with a suitable latch position sensor to detect the axial position of said latch ring with respect to its sleeve;

a speed sensor on said transmission's housing to measure the speed of said output shaft; and, a computerized transmission control unit to command said latch actuators, and to synchronize, in cooperation with said engine control unit, the speed of said output gears with the speed of said output shaft.

4. The transmission according to claim 3, wherein said transmission control unit performs the following operations on a permanent basis:

a) monitoring of said axial position of said latch rings through said latch position sensors;

b) monitoring of said engine speed through said engine control unit;

c) monitoring of said throttle position of said engine through said engine control unit;

d) monitoring of said output shaft speed through said speed sensor on said transmission's housing;

e) computation of a no-load throttle position at the current engine speed, said no-load throttle position being the position that said engine throttle would have if said engine operates disengaged from said transmission at said current engine speed, said no-load throttle position being computed from base values stored in lookup tables in a memory of said transmission control unit, said no-load throttle position being optionally adjusted to other relevant parameters through a parametric equation;

f) computation of a synchronous engine speed for every said gear ratio of said transmission at the current speed of said output shaft, said synchronous engine speed being the engine speed at which said output gear providing said gear ratio has the same speed as said output shaft;

g) optional computation through a parametric equation of a variable speed threshold value, over (for upshifts) or under (for downshifts) said synchronous engine speed, at which said transmission control unit triggers the engagement of said newly selected output gear by its corresponding latch; and, h) optional computation through a parametric equation of the time said engine takes to reach said synchronous speed from the current speed, said time being optionally used to advance the engagement of said newly selected output gear by said corresponding latch.

5. The transmission according to claim 3, wherein said transmission control unit performs the following operations during gear shifts, in the appropriate sequence and timing:

a) activation and deactivation of said coils in said electromagnetic latch actuators;

b) command of said engine throttle position through said engine control unit;

c) interruption and reinstatement of fuel injection to said engine through said engine control unit; and, d) monitoring of the speed of said engine through said engine control unit.

6. The transmission according to claim 3, wherein said engine control unit informs said transmission control unit about the current engine speed as measured by a suitable engine speed sensor, and about said engine throttle position as measured by a suitable throttle position sensor.

7. The transmission according to claim 3, wherein said engine control unit swiftly modifies said engine throttle position through a suitable throttle actuator, as requested by said transmission control unit.

8. The transmission according to claim 3, wherein said engine control unit either swiftly stops said fuel injection to said engine, or swiftly reinstates its own control over said fuel injection, by request of said transmission control unit.

9. In the transmission of claim 3, a method for shifting a previously selected output gear to a newly selected output gear, and for resynchronizing the speed of said engine with the speed of said output shaft, said method comprising the following steps, properly coordinated and timed:

a) said transmission control unit activating said central coil on the latch actuator adjacent to said previously selected output gear;

b) in gear shifts involving gears mounted on opposite sides of a same latch, said transmission control unit optionally activating the side coil adjacent to said newly selected output gear, as to increase the speed at which said latch moves out of said slots in said previously selected output gear;

c) said transmission control unit requesting said engine control unit to momentarily stop said fuel injection (in case said engine drives said powertrain), or fully open said engine throttle (in case said powertrain drives said engine);

d) said latch position sensor, mounted on the side coil adjacent to said previously selected output gear, informing said transmission control unit when the latch contiguous to said previously selected output gear is moving out of said slots in said previously selected output gear;

e) said transmission control unit requesting said engine control unit to either stop said fuel injection in case of upshifts, or fully open said engine throttle in case of downshifts;

f) said latch position sensor, mounted on said central coil on said latch actuator adjacent to said previously selected output gear, informing said transmission control unit when said latch contiguous to said previously selected output gear has reached central position over its sleeve;

g) said transmission control unit disconnecting said central coil on said latch actuator adjacent to said previously selected output gear;

h) in gear shifts involving gears mounted on opposite sides of a same latch, said transmission control disconnecting said side coil adjacent to said newly selected output gear;

i) said transmission control unit activating said side coil, adjacent to said newly selected output gear, when the engine speed reaches a threshold value above (for upshifts) or under (for downshifts) an engine synchronous speed; said synchronous speed being the engine speed at which said newly selected output gear has the same speed as said output shaft; said threshold value being intended to offset any response time of said side coil, and any travel time of said latch from said central position over its sleeve to a position of full engagement with said newly selected output gear;

j) said latch position sensor, mounted on said side coil adjacent to said newly selected output gear, informing said transmission control unit when the latch contiguous to said newly selected output gear is fully engaged with said slots in said newly selected output gear;

k) said transmission control unit disconnecting the side coil adjacent to said newly selected output gear; and, l) said transmission control unit requesting said engine control unit either to reinstate its own control over said fuel injection, or to reestablish the original position of said throttle and return control of said throttle to the engine's operator.

10. In the transmission of claim 3, a method for determining the torque direction through said transmission, which comprises the following steps properly coordinated and timed:

a) said transmission control unit computing a no-load throttle position at the current engine speed, said no-load throttle position being the position that said engine throttle would have if said engine operates disengaged from said transmission at said current engine speed, said no-load throttle position being computed from base values stored in lookup tables in a memory of said transmission control unit, said no-load throttle position being optionally adjusted to other relevant parameters through a parametric equation;

b) said transmission control unit determining the current position of said engine throttle through said engine control unit;

c) said transmission control unit comparing said computed no-load throttle position with the current position of said throttle, and determining that said engine is driving said powertrain when said throttle is open past said no-load throttle position, that said engine is driven by said powertrain when said throttle does not reach said no-load throttle position, or that there is very low or no torque transmitted through said transmission when said throttle is very close to or at said no-load throttle position.

* * * * *